Patented June 21, 1932

1,864,504

UNITED STATES PATENT OFFICE

WILLIAM J. O'BRIEN, OF BALTIMORE, MARYLAND, ASSIGNOR, BY MESNE ASSIGNMENTS, TO KREBS PIGMENT AND COLOR CORPORATION, OF NEWARK, NEW JERSEY, A CORPORATION OF DELAWARE

COMPOSITE PIGMENT

No Drawing. Application filed December 15, 1928. Serial No. 326,409.

My invention relates to a composite pigment and a process of producing the same.

In accordance with my invention, a composite pigment is provided containing titanium oxide and zinc carbonate. I have found that this pigment, when used alone or mixed with other pigments, does not show a tendency to chalk and helps to prevent chalking in other pigments. It also, because of its very light fluffy condition, aids in the non-settling of other pigments while contributing also to the pigment properties of the pigment, such as, increased covering capacity, easy grinding, etc.

To a zinc sulphate solution containing approximately 10% by weight of zinc, as zinc sulphate ($ZnSO_4$) is added titanium oxide ($TiO_2$). The whole mixture is agitated so that a thorough suspension of the titanium oxide in the zinc sulphate solution is obtained. To this mixture containing the zinc sulphate in aqueous solution and titanium oxide in suspension, is added soda ash or sodium carbonate ($Na_2CO_3$), to completely precipitate out the zinc as zinc carbonate ($ZnCO_3$). The titanium oxide is carried along with the zinc carbonate, forming a very homogeneous mixture in the zinc carbonate. The precipitated mass is then filter pressed, dried, and ground and is then ready for shipment as a pigment.

I have found that a satisfactory composite pigment can be obtained by having the titanium oxide content of the composite pigment between 5% to 25% by weight, and the zinc carbonate content from 75% to 95% by weight. It is thus seen that the zinc carbonate content is present in a preponderance by weight. A specific example of one process of producing a satisfactory composite pigment is as follows:

To make up a composite pigment containing approximately 20% by weight of titanium oxide and 80% by weight of zinc carbonate, the following materials are employed in the proportions stated:

1,000 pounds of an aqueous solution of zinc sulphate of approximately 36 Bé. at 60° C. containing approximately 10% of zinc as zinc sulphate; 658 pounds of sodium carbonate, or the equivalent soda ash to make 100% sodium carbonate, and approximately 194 pounds of titanium oxide.

In the practice of the process, the titanium oxide in a finely powdered condition is added to the aqueous solution of zinc sulphate, and the entire mass is thoroughly stirred or agitated so that a thorough suspension of the titanium oxide in the zinc sulphate solution is obtained. While rapidly stirring this mass, the sodium carbonate, or the equivalent soda ash, to make up 100% sodium carbonate, in the form of a dry powder or as a thin slurry, is added to completely precipitate the zinc as zinc carbonate. The resulting precipitate containing the zinc carbonate and titanium oxide is filter pressed, dried and ground, and is then ready for shipment for use as a pigment. The re-action is represented by the following equation:

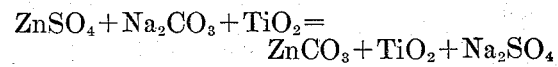
$$ZnSO_4 + Na_2CO_3 + TiO_2 = ZnCO_3 + TiO_2 + Na_2SO_4$$

It is to be understood that the above is an example of one method of producing a satisfactory pigment containing approximately 20% by weight of titanium oxide and 80% by weight of zinc carbonate. I have also found that a satisfactory pigment can be produced by raising or lowering the titanium oxide content of the pigment, which may be accomplished by lowering or increasing the amount of titanium oxide employed in the re-action.

It is to be understood that the form of my invention, herewith described, is to be taken as a preferred example of the same, and that various changes may be resorted to in the order of the steps of the method, and that chemical equivalents may be employed, without departing from the spirit of my invention, or the scope of the subjoined claims.

Having thus described my invention, I claim:—

1. A composite pigment comprising titanium oxide and zinc carbonate, the zinc carbonate being present in preponderance by weight.

2. A composite pigment comprising about 5 to 25% by weight of titanium dioxide and about 75 to 95% by weight of zinc carbonate.

3. A composite pigment consisting of about 80% by weight of zinc carbonate and 20% by weight of titanium dioxide.

In testimony whereof I affix my signature.

WILLIAM J. O'BRIEN.